(12) United States Patent
Ushiyama

(10) Patent No.: US 10,707,500 B2
(45) Date of Patent: Jul. 7, 2020

(54) FUEL CELL SYSTEM

(71) Applicant: HONDA MOTOR CO., LTD., Tokyo (JP)

(72) Inventor: Hideyuki Ushiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 741 days.

(21) Appl. No.: 15/059,760

(22) Filed: Mar. 3, 2016

(65) Prior Publication Data

US 2016/0268612 A1 Sep. 15, 2016

(30) Foreign Application Priority Data

Mar. 13, 2015 (JP) .................................. 2015-050488

(51) Int. Cl.
| | |
|---|---|
| *H01M 8/04014* | (2016.01) |
| *H01M 8/04089* | (2016.01) |
| *H01M 8/04858* | (2016.01) |
| *H01M 8/02* | (2016.01) |
| *H01M 8/04701* | (2016.01) |
| *H01M 8/04828* | (2016.01) |
| *H01M 8/1007* | (2016.01) |
| *H01M 8/04082* | (2016.01) |

(52) U.S. Cl.
CPC ......... *H01M 8/04014* (2013.01); *H01M 8/02* (2013.01); *H01M 8/04089* (2013.01); *H01M 8/0494* (2013.01); *H01M 8/04701* (2013.01); *H01M 8/04932* (2013.01); *H01M 8/04201* (2013.01); *H01M 8/04738* (2013.01); *H01M 8/1007* (2016.02)

(58) Field of Classification Search
CPC ....................... H01M 8/04089; H01M 8/04201
See application file for complete search history.

(56) References Cited

U.S. PATENT DOCUMENTS

| | | | | |
|---|---|---|---|---|
| 2003/0035986 A1* | 2/2003 | Yang | ........................ | F04B 43/02 |
| | | | | 429/415 |
| 2011/0020715 A1* | 1/2011 | Shinoda | ............ | H01M 8/04014 |
| | | | | 429/410 |

FOREIGN PATENT DOCUMENTS

| | | |
|---|---|---|
| JP | 04-194327 | 7/1992 |
| JP | 05-290868 | 11/1993 |
| JP | 2006-302606 | 11/2006 |
| JP | 2007-188641 | 7/2007 |
| JP | 2009-043526 | 2/2009 |
| JP | 2011-228180 | 10/2011 |
| JP | 2013-191324 | 9/2013 |
| JP | 2014-216171 | 11/2014 |

OTHER PUBLICATIONS

Japanese Office Action with partial English translation dated Jun. 7, 2016, 5 pages.

\* cited by examiner

*Primary Examiner* — Ladan Mohaddes
(74) *Attorney, Agent, or Firm* — Rankin, Hill & Clark LLP

(57) ABSTRACT

A fuel cell system includes a fuel cell module, auxiliary equipment, a power converter, and a casing containing the fuel cell module, the auxiliary equipment, and the power converter. The casing has a plurality of surfaces including one detachable maintenance surface. Only the maintenance surface has an air intake port for taking an oxygen-containing gas into the casing, an air exhaust port for discharging an exhaust gas discharged from the fuel cell module, to the outside of the casing, and a ventilation inlet port and a ventilation outlet port for ventilation of an inside of the casing by air.

6 Claims, 4 Drawing Sheets

FUEL CELL SYSTEM

CROSS-REFERENCE TO RELATED APPLICATION

This application is based upon and claims the benefit of priority from Japanese Patent Application No. 2015-050488 filed on Mar. 13, 2015, the contents of which are incorporated herein by reference.

BACKGROUND OF THE INVENTION

Field of the Invention

The present invention relates to a fuel cell system including a fuel cell module, auxiliary equipment, a power converter, and a casing housing the fuel cell module, the auxiliary equipment, and the power converter.

Description of the Related Art

In general, a solid oxide fuel cell (SOFC) employs a solid electrolyte. The solid electrolyte is an oxide ion conductor such as stabilized zirconia. The solid electrolyte is interposed between an anode and a cathode to form an electrolyte electrode assembly (MEA). The electrolyte electrode assembly is sandwiched between separators (bipolar plates). In use, generally, predetermined numbers of the electrolyte electrode assemblies and the separators are stacked together to form a fuel cell stack.

As the fuel gas supplied to the fuel cell, normally, a hydrogen gas (reformed gas) produced from hydrocarbon raw material by a reformer is used. In general, in the reformer, a reforming raw gas is obtained from a hydrocarbon raw fuel of a fossil fuel or the like, such as methane or LNG, and thereafter, the reforming raw gas undergoes steam reforming, partial oxidation reforming, or autothermal reforming, etc. to produce a fuel gas.

In this regard, there has been known a fuel cell system (fuel cell power supply) equipped with auxiliary equipment (BOP) in addition to the fuel cell in a single unit case. For example, the auxiliary equipment includes a power converter (power conditioner) for converting direct current electrical energy generated in the fuel cell into an electric power according to a power supply output specification, a control device, a reformer, and various peripheral devices such as blowers, pumps, and sensors.

As a technique which adopts a system of this type, for example, a fuel cell system disclosed in Japanese Laid-Open Patent Publication No. 2011-228180 is known. In this fuel cell system, a fuel cell module, a combustor, a fuel gas supply apparatus, an oxygen-containing gas supply apparatus, a water supply apparatus, a power converter, and a control device are housed in a casing. The casing has a door which can be opened or closed relative to a casing body with a connector portion as a fulcrum. The power converter and the control device are attached to the door.

According to the disclosure, with a simple and compact structure, maintenance operation of parts or components in the casing can be performed easily, and it becomes possible to improve the maintainability.

Further, in a sound proof engine operation machine disclosed in Japanese Laid-Open Patent Publication No. 04-194327, a battery, a terminal box, and an air cleaner are arranged so as to face a left or right side wall plate where the open/close covers are provided for maintenance purpose.

SUMMARY OF THE INVENTION

The present invention has been made in relation to these types of technique, and an object of the present invention is to provide a fuel cell system which makes it possible to enhance installation flexibility thereof, and enables maintenance operations to be performed more easily and promptly.

In a fuel cell system according to the present invention, a fuel cell module, auxiliary equipment, and a power converter are provided in a casing. The fuel cell module generates electric power by electrochemical reactions of a fuel gas and an oxygen-containing gas. The auxiliary equipment is a peripheral device of the fuel cell module. The power converter converts direct-current electric power generated in the fuel cell module into an electric power according to a power supply output specification.

The casing has a plurality of surfaces including one detachable or openable/closable maintenance surface. Only the maintenance surface includes an air intake port for taking the oxygen-containing gas into the casing, an air exhaust port for discharging an exhaust gas discharged from the fuel cell module, to the outside of the casing, and a ventilation inlet port and a ventilation outlet port for ventilation of an inside of the casing by air.

In the present invention, only one surface of the casing, i.e., the maintenance surface, has the air intake port, the air exhaust port, the ventilation inlet port, and the ventilation outlet port. In the structure, it is possible to concentrate the design of the flow of the air only on one surface, and thus the system is suitable especially in the case of installing the casing in a narrow and small space. Therefore, it becomes possible to enhance flexibility in installation of the system, and maintenance operations can be performed more easily and promptly.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
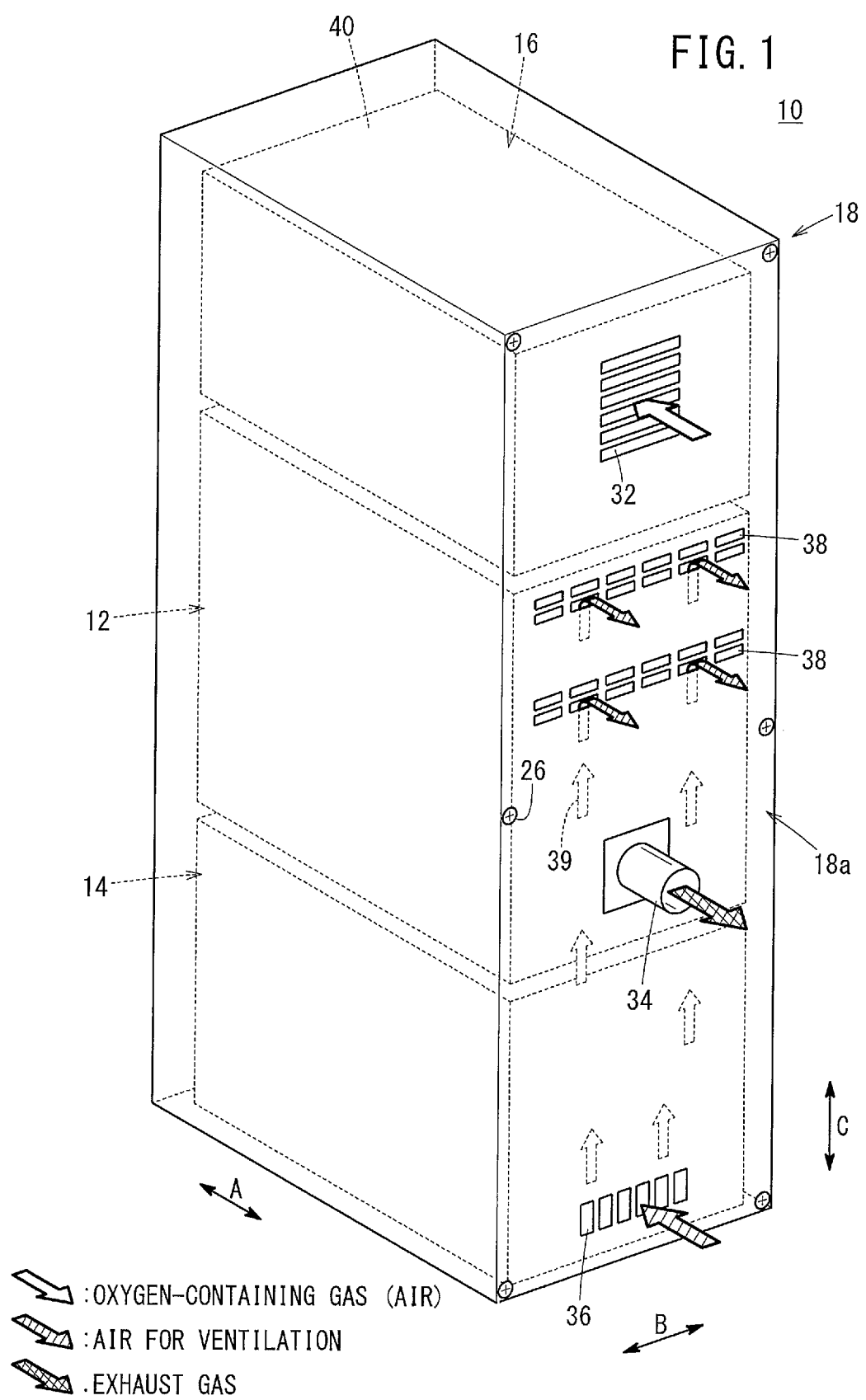
FIG. 1 is a perspective view schematically showing a fuel cell system according to an embodiment of the present invention.
Figure 2:
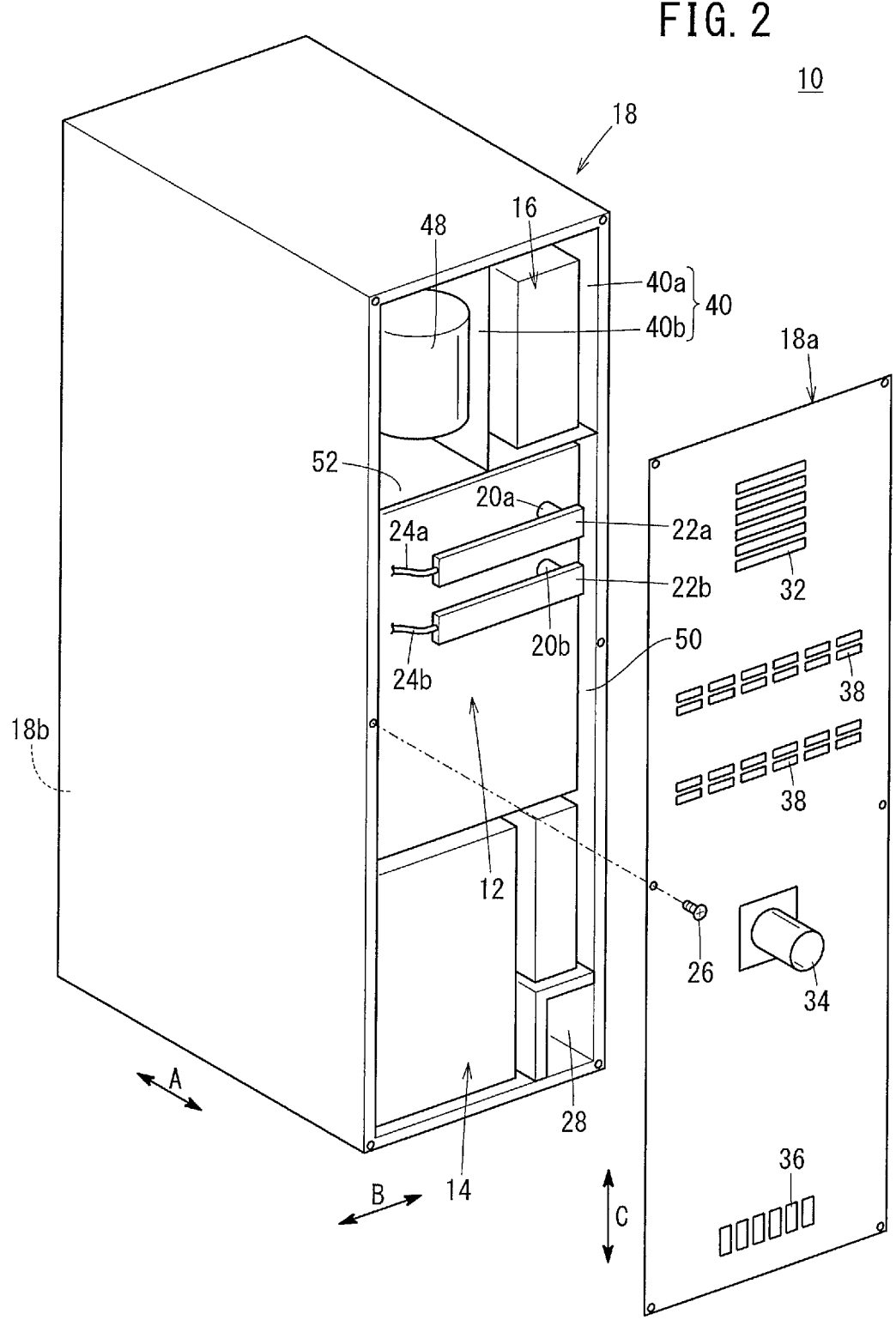
FIG. 2 is a perspective view showing the fuel cell system in a state where a maintenance surface is detached from the fuel cell system.

A fuel cell system 10 according to an embodiment of the present invention shown in FIGS. 1 and 2 is used in a stationary application. Additionally, the fuel cell system 10 may be used in various applications. For example, the fuel cell system 10 is mounted on a vehicle.

The fuel cell system 10 includes a fuel cell module 12, auxiliary equipment 14, a power converter 16, and a casing 18 housing the fuel cell module 12, the auxiliary equipment 14, and the power converter 16. The fuel cell module 12 performs power generation by electrochemical reaction of a fuel gas (hydrogen gas) and an oxygen-containing gas (air). In the casing 18, as described later, the auxiliary equipment 14, the fuel cell module 12, and the power converter 16 are arranged in the order recited, from the lower side to the upper side.

Though not shown, the fuel cell module 12 includes an electrolyte electrode assembly. The electrolyte electrode assembly includes an anode, a cathode, and an electrolyte interposed between the anode and the cathode. The electrolyte is a solid electrolyte (solid oxide) as an oxide ion conductor made of, e.g., stabilized zirconia. The electrolyte electrode assembly and separators are stacked together to form a solid oxide fuel cell, and a plurality of the fuel cells are stacked together in the vertical direction.

As shown in FIG. 2, output terminals 20$a$, 20$b$ protruding toward the outside are provided on the fuel cell module 12. For example, the output terminal 20$a$ is a direct current plus terminal, and the output terminal 20$b$ is a direct current minus terminal. Rectangular bus bars 22$a$, 22$b$ extend outside the fuel cell module 12. The output terminal 20$a$ is electrically connected to one end of the rectangular bus bar 22$a$ in the longitudinal direction, and the output terminal 20$b$ is electrically connected to one end of the rectangular bus bar 22$b$ in the longitudinal direction.

The one end of the rectangular bus bar 22$a$ in the longitudinal direction is fixed to the output terminal 20$a$ using a bolt, and the one end of the rectangular bus bar 22$b$ in the longitudinal direction is fixed to the output terminal 20$b$ using a bolt. The other end of the rectangular bus bar 22$a$ in the longitudinal direction is fixed to one end of a wiring line 24$a$ using a bolt, and the other end of the rectangular bus bar 22$b$ is fixed to one end of a wiring line 24$b$ using a bolt. The other end of the wiring line 24$a$ and the other end of the wiring line 24$b$ are electrically connected to the power converter 16 for transmitting electric power.

The auxiliary equipment 14 includes peripheral devices (BOP) of the fuel cell modules 12. Though not shown, the auxiliary equipment 14 includes a reformer, an evaporator, an exhaust gas combustor, a start-up combustor, an air preheater, blowers, pumps, sensors, etc. The reformer performs steam reforming of a raw fuel chiefly containing hydrocarbon (e.g., city gas) to produce a fuel gas supplied to the fuel cell module 12. The evaporator evaporates water to produce water vapor, and supplies the water vapor to the reformer.

The exhaust gas combustor combusts the fuel gas discharged from the fuel cell module 12 as a fuel exhaust gas and the oxygen-containing gas discharged from the fuel cell module 12 as an oxygen-containing exhaust gas, to thereby produce a combustion exhaust gas. The start-up combustor combusts the raw fuel and the oxygen-containing gas to produce a combustion gas. The air preheater heats the oxygen-containing gas by heat exchange with the combustion gas or the fuel exhaust gas, and supplies the heated oxygen-containing gas to the fuel cell module 12.

The power converter (power conditioner) 16 converts direct-current electric power generated in the fuel cell module 12 into an electric power according to a power supply output specification. An alternating-current power can be supplied to the power converter 16 from a system power supply.

The casing 18 includes a plurality of, e.g., six surfaces. One side surface at one end in a direction indicated by an arrow A is a detachable maintenance surface 18$a$. The maintenance surface 18$a$ is fixed to the casing 18 using a plurality of screw bolts 26. The maintenance surface 18$a$ can open, and close an opening 28. In the casing 18, the auxiliary equipment 14 is provided on the lower side, and the fuel cell module 12 is provided above the auxiliary equipment 14 (on an upper side in the direction indicated by the arrow C). The power converter 16 is provided above the fuel cell module 12. Alternatively, the maintenance surface 18$a$ may be attached to the casing 18 through hinges, etc. so as to be openable and closable.

In the casing 18, only the maintenance surface 18$a$ has an air intake port 32, an air exhaust port 34, a ventilation inlet port 36, and a ventilation outlet port 38. The air intake port 32 includes a plurality of openings for taking the oxygen-containing gas into the casing 18, the openings being arranged in the direction indicated by the arrow C on an upper part of the maintenance surface 18$a$. The air exhaust port 34 is a single pipe for discharging the exhaust gases (fuel exhaust gas and oxygen-containing exhaust gas) discharged from the fuel cell module 12, to the outside of the casing 18. The air exhaust port 34 is provided at a position shifted downward from the center of the maintenance surface 18$a$ in the height direction.

The ventilation inlet port 36 includes a plurality of inlet openings for ventilation of the inside of the casing 18 by air, the inlet openings being arranged in a direction indicated by an arrow B on a lower part of the maintenance surface 18$a$. The ventilation outlet port 38 includes a plurality of outlet openings for ventilation of the inside of the casing 18 by air, the outlet openings being arranged in the direction indicated by the arrow B on an upper side of the maintenance surface 18$a$ (below the air intake port 32) in two upper and lower rows.

In the casing 18, the ventilation inlet port 36 and the ventilation outlet port 38 are connected by a duct, and a ventilation fan (not shown) is provided between the ventilation inlet port 36 and the ventilation outlet port 38. A ventilation flow channel 39 is formed in the casing 18. The ventilation flow channel 39 communicates with the ventilation inlet port 36 and the ventilation outlet port 38 and allows air to flow inside the maintenance surface 18$a$ along the rectangular bus bars 22$a$, 22$b$ (see FIG. 1).

Figure 3:
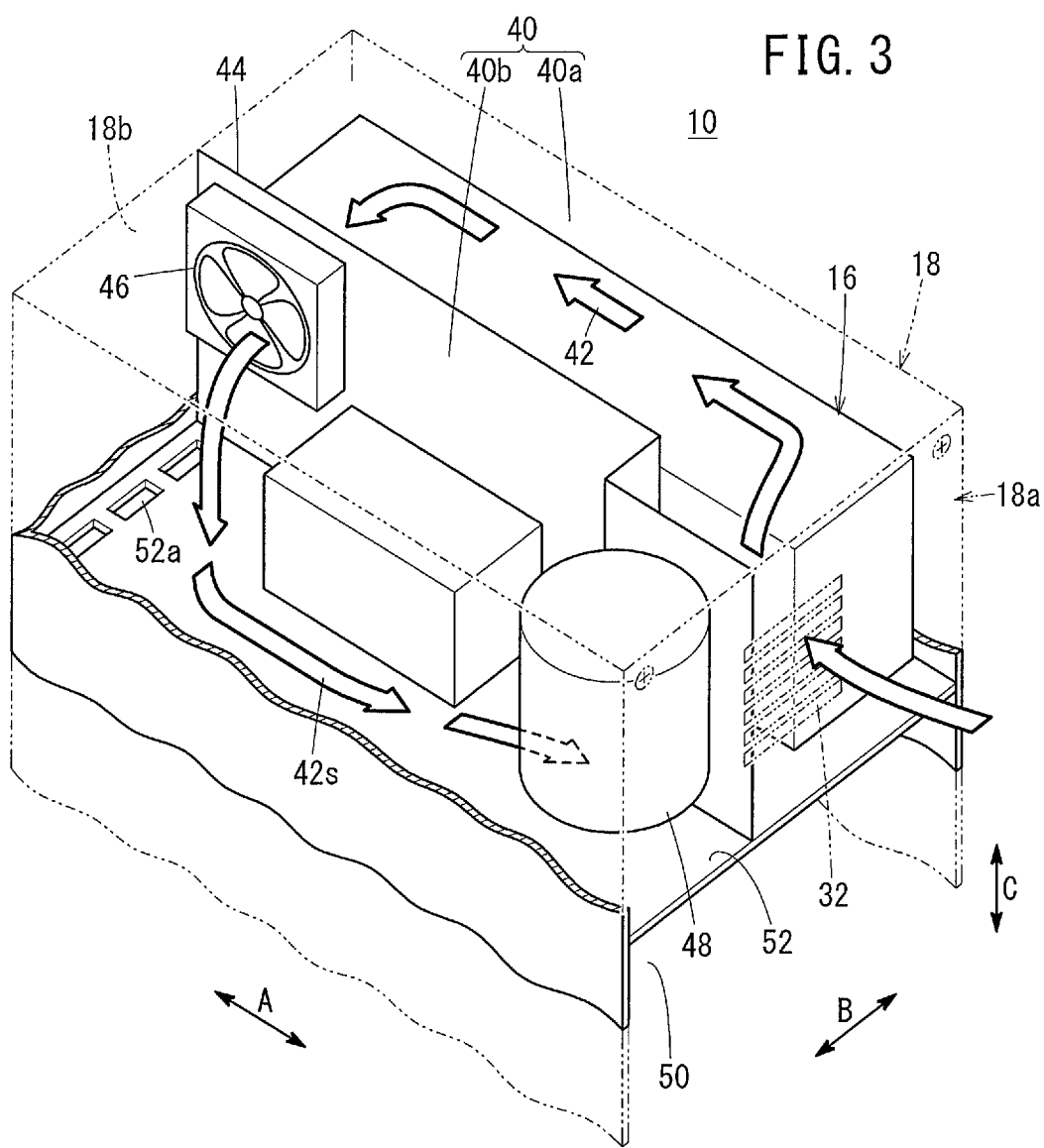
FIG. 3 is an internal perspective view showing the upper side of the fuel cell system.
Figure 4:
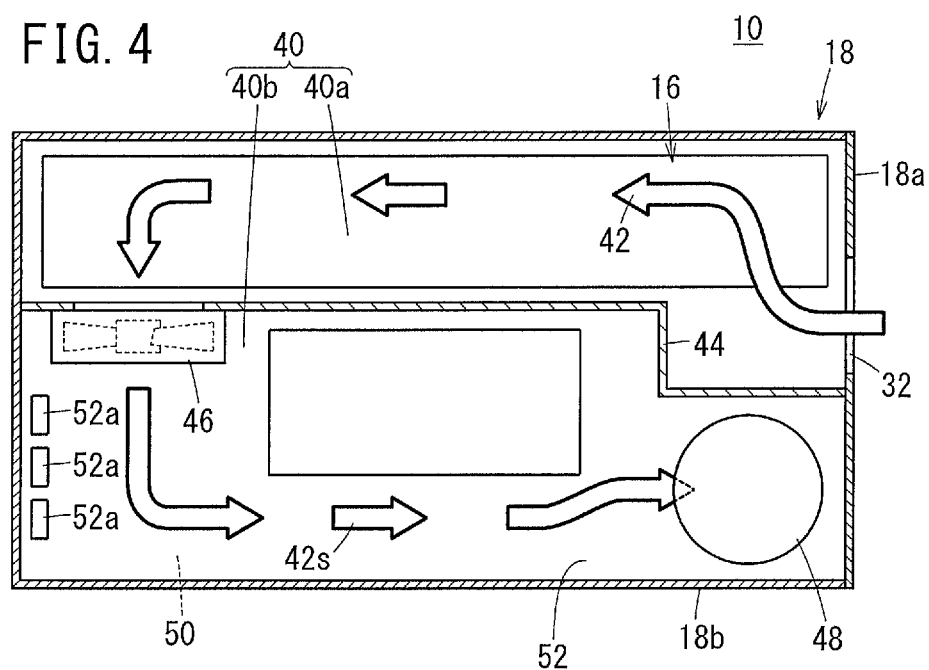
FIG. 4 is an internal plan view showing the upper side of the fuel cell system.

As shown in FIGS. 3 and 4, a power converter chamber 40 and an air intake flow channel 42 are provided on the upper side in the casing 18. The power converter chamber 40 communicates with the air intake port 32, and contains the power converter 16. The oxygen-containing gas flows from the air intake port 32 into the air intake flow channel 42. The air intake flow channel 42 allows the oxygen-containing gas to flow along the power converter 16 provided in the power converter chamber 40. A guide wall plate 44 extending in the direction indicated by the arrow A is provided in the power converter chamber 40 to divide the power converter chamber 40 into two areas 40$a$, 40$b$ in the direction indicated by the arrow B. In the power converter chamber 40, the power converter 16 is provided in the area 40$a$ communicating with the air intake port 32.

An air intake fan 46 is attached to the guide wall plate 44, adjacent to the inner side of a back surface 18$b$ opposite to the maintenance surface 18$a$. The air intake flow channel 42 has a serpentine flow channel section 42$s$. The serpentine flow channel section 42$s$ is positioned downstream of the power converter 16 in the flow direction of the oxygen-containing gas, i.e., positioned in the area 40$b$, and includes bent or curved portions.

An oxygen-containing gas supply unit 48 is provided just inside the maintenance surface 18$a$, for supplying the oxygen-containing gas that has flowed through the air intake flow channel 42, to the oxygen-containing gas system flow channel of the fuel cell module 12. The oxygen-containing gas supply unit 48 has a chemical filter.

A fuel cell module chamber 50 containing the fuel cell module 12 is provided in the casing 18. The power converter chamber 40 and the fuel cell module chamber 50 are separated vertically by a partition plate 52. A plurality of communication ports 52a are formed in the partition plate 52 on a side opposite to the maintenance surface 18a. The oxygen-containing gas flows from the power converter chamber 40 into the fuel cell module chamber 50 through the communication ports 52a.

Operation of the fuel cell system 10 will be described below.

At the time of starting operation of the fuel cell system 10, alternating current electric power is supplied from the system power supply to the power converter 16, and the electric power is supplied to the auxiliary equipment 14. Therefore, a fuel gas produced by steam reforming of a raw fuel such as the city gas (containing $CH_4$, $C_2H_6$, $C_3H_8$, $C_4H_{10}$), etc. is supplied to the fuel gas system flow channel of the fuel cell module 12. In the meanwhile, for example, the air as an oxygen-containing gas is supplied to the oxygen-containing gas system flow channel of the fuel cell module 12.

Specifically, as shown in FIGS. 3 and 4, since the air intake fan 46 is operated, the oxygen-containing gas (hereinafter also simply referred to as the air) flows from the air intake port 32 into the area 40a of the power converter chamber 40. The air flows along the air intake flow channel 42 and cools the power converter 16. Thereafter, the air flows into the serpentine flow channel section 42s of the area 40b. Therefore, after the air flows along the serpentine flow channel section 42s, the air is supplied to the oxygen-containing gas supply unit 48, and then supplied to the oxygen-containing gas system flow channel of the fuel cell module 12.

Therefore, in the electrolyte electrode assembly, power generation is performed by electrochemical reactions of the fuel gas and the air. The direct current voltage outputted from each of the fuel cells is collected from the output terminals 20a, 20b to the rectangular bus bars 22a, 22b, and transmitted to the power converter 16.

In the embodiment of the present invention, as shown in FIGS. 1 and 2, only the maintenance surface 18a (one surface) of the casing 18 has the air intake port 32, the air exhaust port 34, the ventilation inlet port 36, and the ventilation outlet port 38. In the structure, it is possible to concentrate the design of the flow of the air (oxygen-containing gas) only on the maintenance surface 18a, and thus the system is suitable especially in the case of installing the casing 18 in a narrow and small space. Accordingly, the fuel cell system 10 makes it possible to enhance flexibility in installation of the fuel cell system 10, and enables maintenance operations to be performed more easily and promptly.

Further, as shown in FIG. 3, in the casing 18, the power converter chamber 40 containing the power converter 16, and the air intake flow channel 42 for allowing the air introduced into the casing 18 through the air intake port 32 to flow along the power converter 16 are provided. In the structure, the air introduced into the casing 18 through the air intake port 32 can cools the power converter 16 reliably.

Further, the oxygen-containing gas supply unit 48 is provided inside the maintenance surface 18a, for supplying the air that has flowed through the air intake flow channel 42, to the oxygen-containing gas system flow channel of the fuel cell module 12. In this regard, the oxygen-containing gas supply unit 48 has the chemical filter. Therefore, the chemical filter, which is a part that requires maintenance, is positioned inside the maintenance surface 18a, and thus the maintenance operation of the chemical filter can be performed easily and promptly.

Further, as shown in FIGS. 3 and 4, the air intake flow channel 42 has the serpentine flow channel section 42s. The serpentine flow channel section 42s is positioned downstream of the power converter 16 in the flow direction of the oxygen-containing gas, i.e., positioned in the area 40b, and includes bent or curved portions. Thus, since the air intake flow channel 42 is elongated downstream of the power converter 16, dust (dust particles), water, etc. can be separated from the oxygen-containing gas reliably. Further, it becomes possible to reduce occurrence of pulsation easily.

Further, in the air intake flow channel 42, the air intake fan 46 is provided adjacent to the inner side of the back surface 18b opposite to the maintenance surface 18a. Therefore, by operation of the air intake fan 46, the air introduced from the air intake port 32 into the casing 18 flows through the air intake flow channel 42, and cools the power converter 16 provided in the power converter chamber 40. Thereafter, the air flows into the serpentine flow channel section 42s. Accordingly, it is possible to reliably cool the power converter 16.

Further, in the casing 18, the fuel cell module chamber 50 containing the fuel cell module 12 is provided, and the power converter chamber 40 and the fuel cell module chamber 50 are separated vertically by the partition plate 52. In this regard, the communication ports 52a are formed in the partition plate 52 on the side opposite to the maintenance surface 18a, for allowing air to flow from the power converter chamber 40 into the fuel cell module chamber 50.

In the structure, when the flow rate of the air supplied to the air intake flow channel 42 is larger than the flow rate of the air (oxygen-containing gas) required for the fuel cell module 12, the excessive air flows through the communication ports 52a of the partition plate 52, and the excessive air is supplied to the fuel cell module chamber 50. Therefore, even if the excessive air is supplied to the air intake flow channel 42, it becomes possible to efficiently use the excessive air as a coolant.

Further, as shown in FIGS. 1 and 2, in the maintenance surface 18a, the ventilation outlet port 38 is provided above the ventilation inlet port 36. Therefore, the air supplied into the casing 18 flows upward from the lower side smoothly in the casing 18 so as to ventilate the casing 18 reliably. Thereafter, the air can be discharged to the outside from the ventilation outlet port 38.

Further, as shown in FIG. 2, the fuel cell module 12 has the rectangular bus bars 22a, 22b electrically connected to the output terminals 20a, 20b for outputting electrical energy (electric power) generated in the power generation. In this regard, the output terminals 20a, 20b and the rectangular bus bars 22a, 22b are provided inside the maintenance surface 18a.

Further, the ventilation flow channel 39 is formed for allowing the air introduced from the ventilation inlet port 36 into the casing 18 to flow along the rectangular bus bars 22a, 22b, and then discharging the air to the ventilation outlet port 38. In the structure, it becomes possible to easily and reliably cool the rectangular bus bars 22a, 22b heated to high temperature due to high electric current.

While the invention has been particularly shown and described with reference to a preferred embodiment, it will be understood that variations and modifications can be effected thereto by those skilled in the art without departing from the scope of the invention as defined by the appended claims.

What is claimed is:

1. A fuel cell system comprising:
a fuel cell module configured to generate electric power by electrochemical reactions of a fuel gas and an oxygen-containing gas;
auxiliary equipment as a peripheral device of the fuel cell module;
a power converter configured to convert direct-current electric power generated in the fuel cell module into an electric power according to a power supply output specification; and
a casing housing the fuel cell module, the auxiliary equipment, and the power converter,
wherein
the casing has a plurality of surfaces, the surfaces including one maintenance surface, the maintenance surface being one of detachable or openable/closable;
only the maintenance surface has:
an air intake port configured to take the oxygen-containing gas into the casing;
an air exhaust port configured to discharge an exhaust gas discharged from the fuel cell module, to outside of the casing; and
a ventilation inlet port and a ventilation outlet port for ventilation of an inside of the casing by air;
the casing contains therein:
a power converter chamber communicating with the air intake port and containing the power converter;
an air intake flow channel configured to allow the oxygen-containing gas introduced from the air intake port into the casing to flow along the power converter provided in the power converter chamber; and
a fuel cell module chamber containing the fuel cell module;
the power converter chamber is divided by a guide wall plate into:
a first area that is provided with the air intake port and extends between the maintenance surface and a back surface of the casing that is opposite to the maintenance surface, and
a second area that extends between the maintenance surface and the back surface of the casing,
an oxygen-containing gas supply unit is provided in the second area inside the maintenance surface, the oxygen-containing gas supply unit being configured to supply the oxygen-containing gas that has flowed through the air intake flow channel, to an oxygen-containing gas system flow channel of the fuel cell module;
the oxygen-containing gas supply unit has a chemical filter; and
the power converter chamber and the fuel cell module chamber are separated by a partition plate.

2. The fuel cell system according to claim 1, wherein the air intake flow channel has a serpentine flow channel section, and the serpentine flow channel section is positioned downstream of the power converter in a flow direction of the oxygen-containing gas, and includes a bent or curved portion.

3. The fuel cell system according to claim 1, wherein, in the air intake flow channel, an air intake fan is provided adjacent to an inner side of the back surface of the casing opposite to the maintenance surface.

4. The fuel cell system according to claim 1, wherein
the power converter chamber and the fuel cell module chamber are separated vertically by the partition plate; and
a communication port is formed in the partition plate on a side opposite to the maintenance surface, the communication port being configured to allow the oxygen-containing gas to flow from the power converter chamber to the fuel cell module chamber.

5. The fuel cell system according to claim 1, wherein the ventilation outlet port is provided above the ventilation inlet port.

6. The fuel cell system according to claim 1, wherein the fuel cell module includes:
an output terminal configured to output the generated electric power to the outside; and
a bus bar electrically connected to the output terminal, and wherein the output terminal and the bus bar are provided inside the maintenance surface; and
a ventilation flow channel is formed, the ventilation flow channel being configured to allow the air introduced at least from the ventilation inlet port into the casing to flow along the bus bar, and then discharge the air to the ventilation outlet port.

* * * * *